Sept. 6, 1938.   C. R. PATON   2,129,232
MOTOR VEHICLE
Filed Dec. 17, 1934    5 Sheets-Sheet 1

Inventor
Clyde R. Paton
By Watson, Coit, Morse & Prindle
Attorney

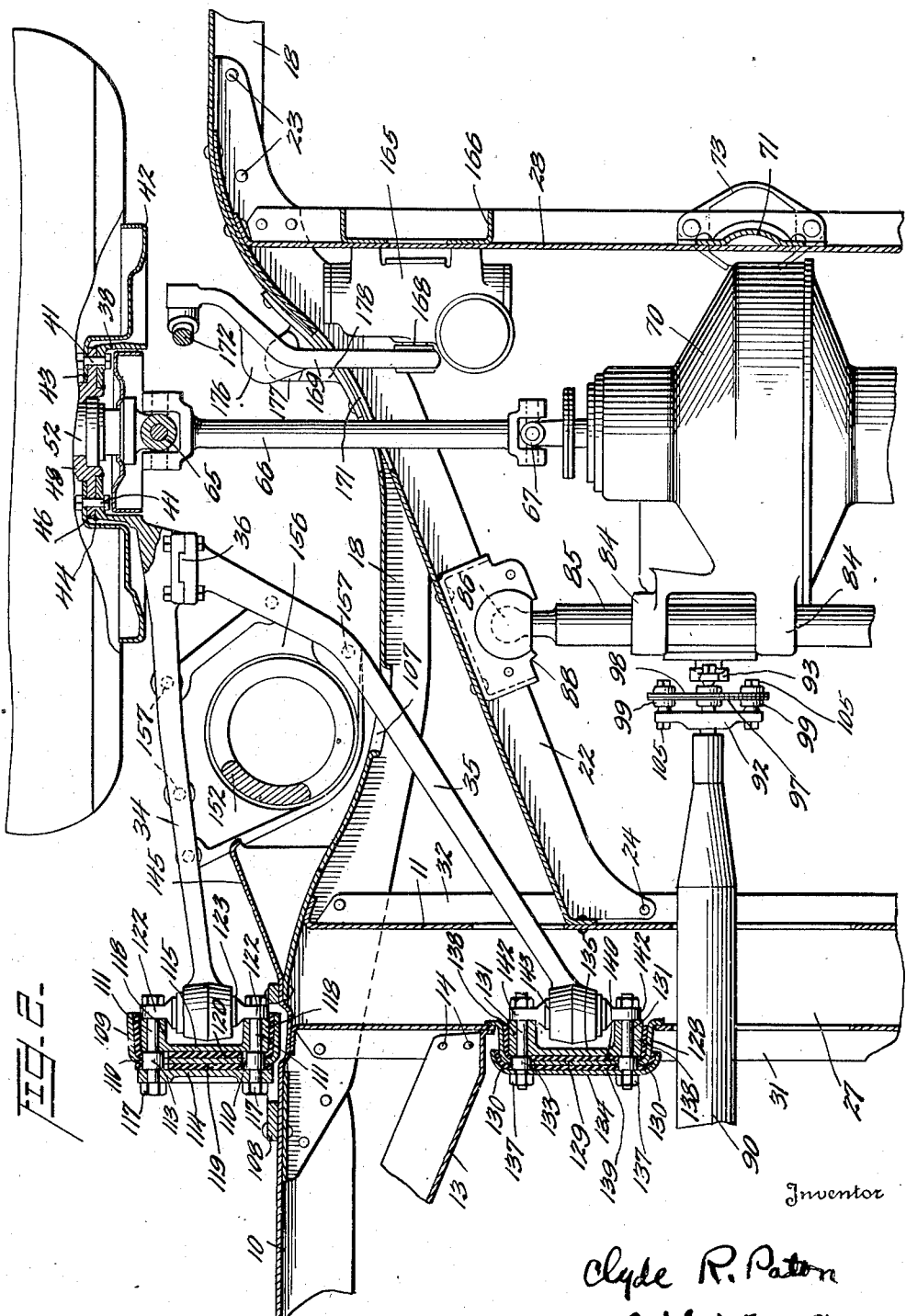

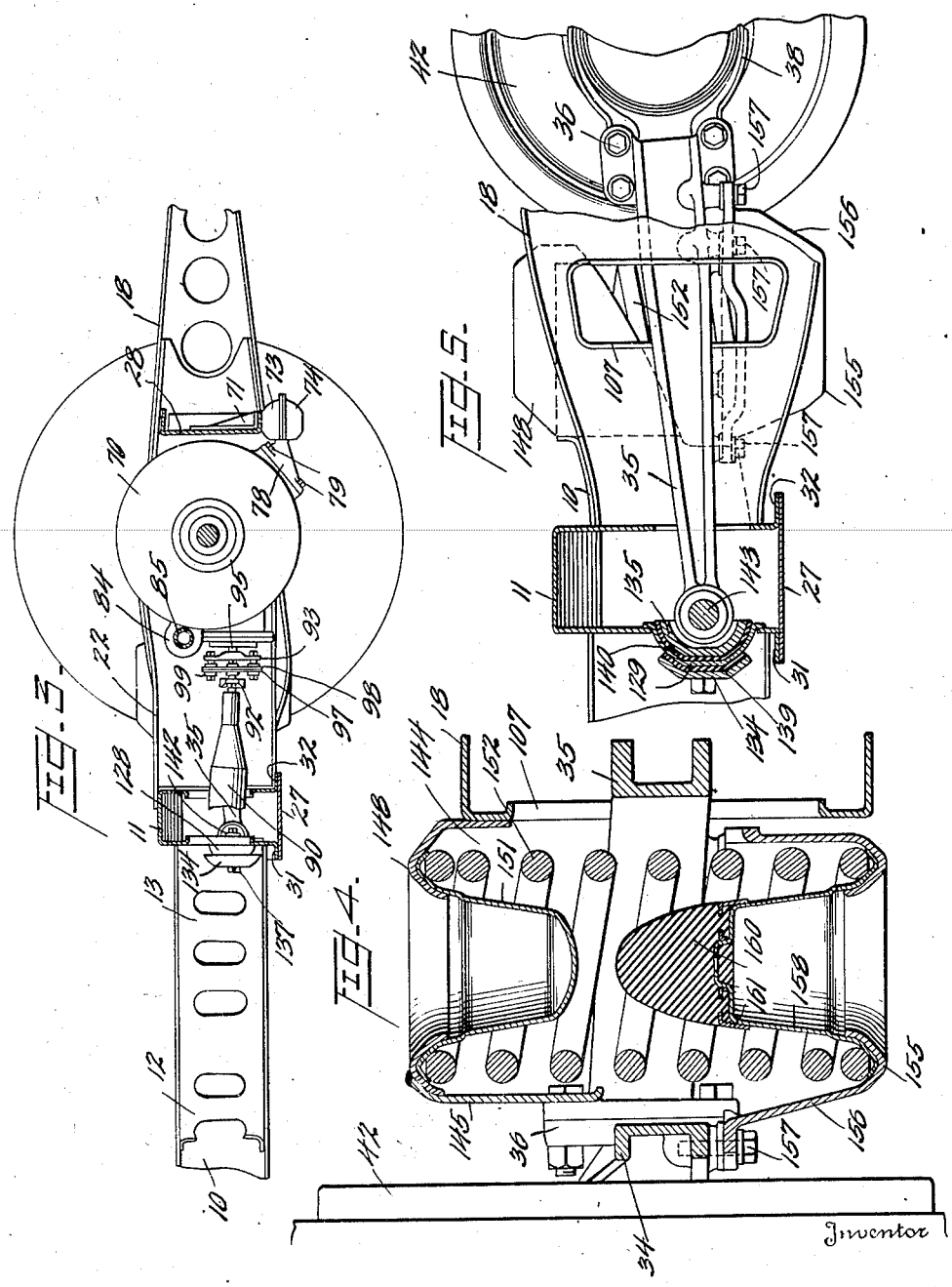

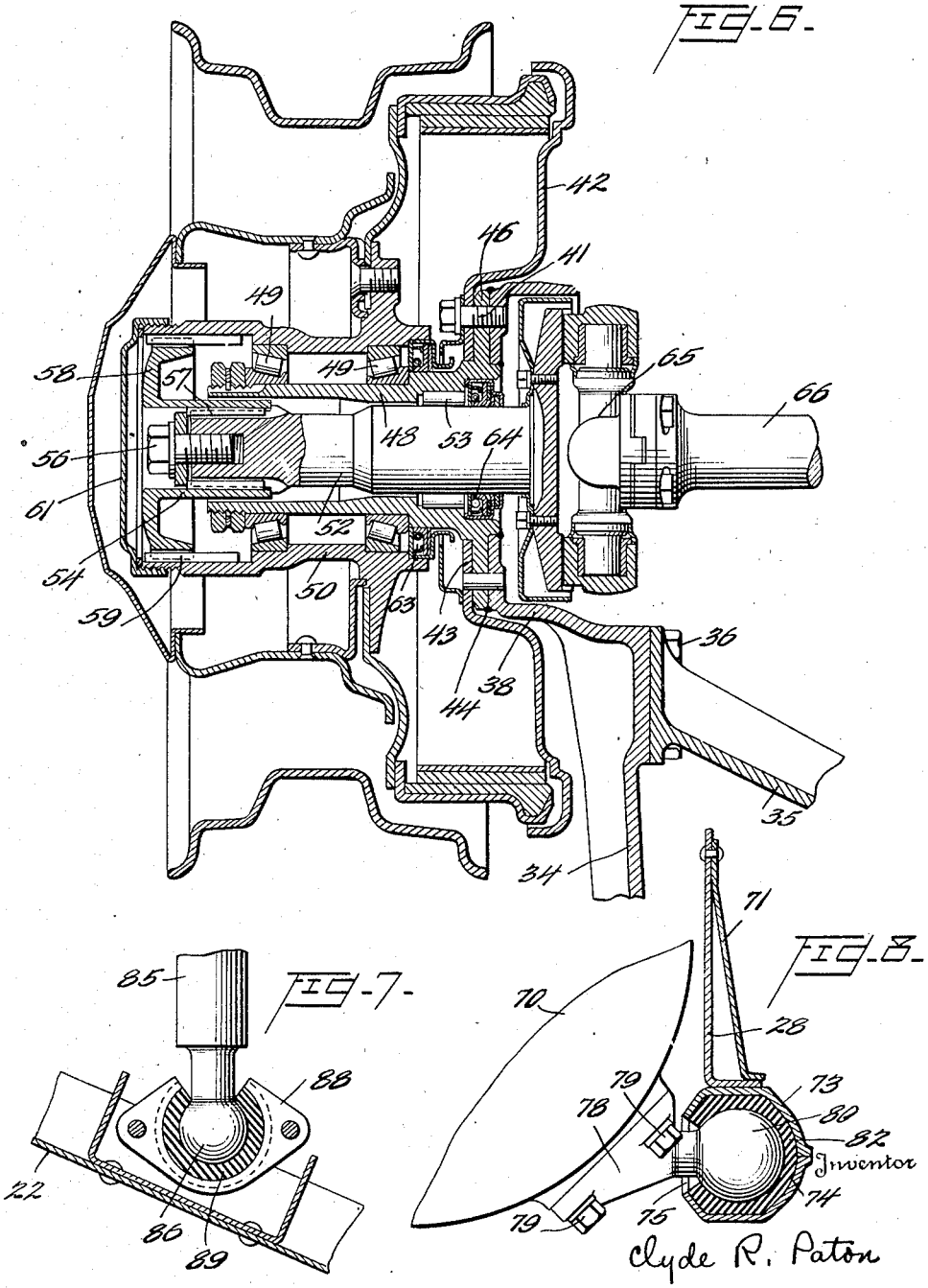

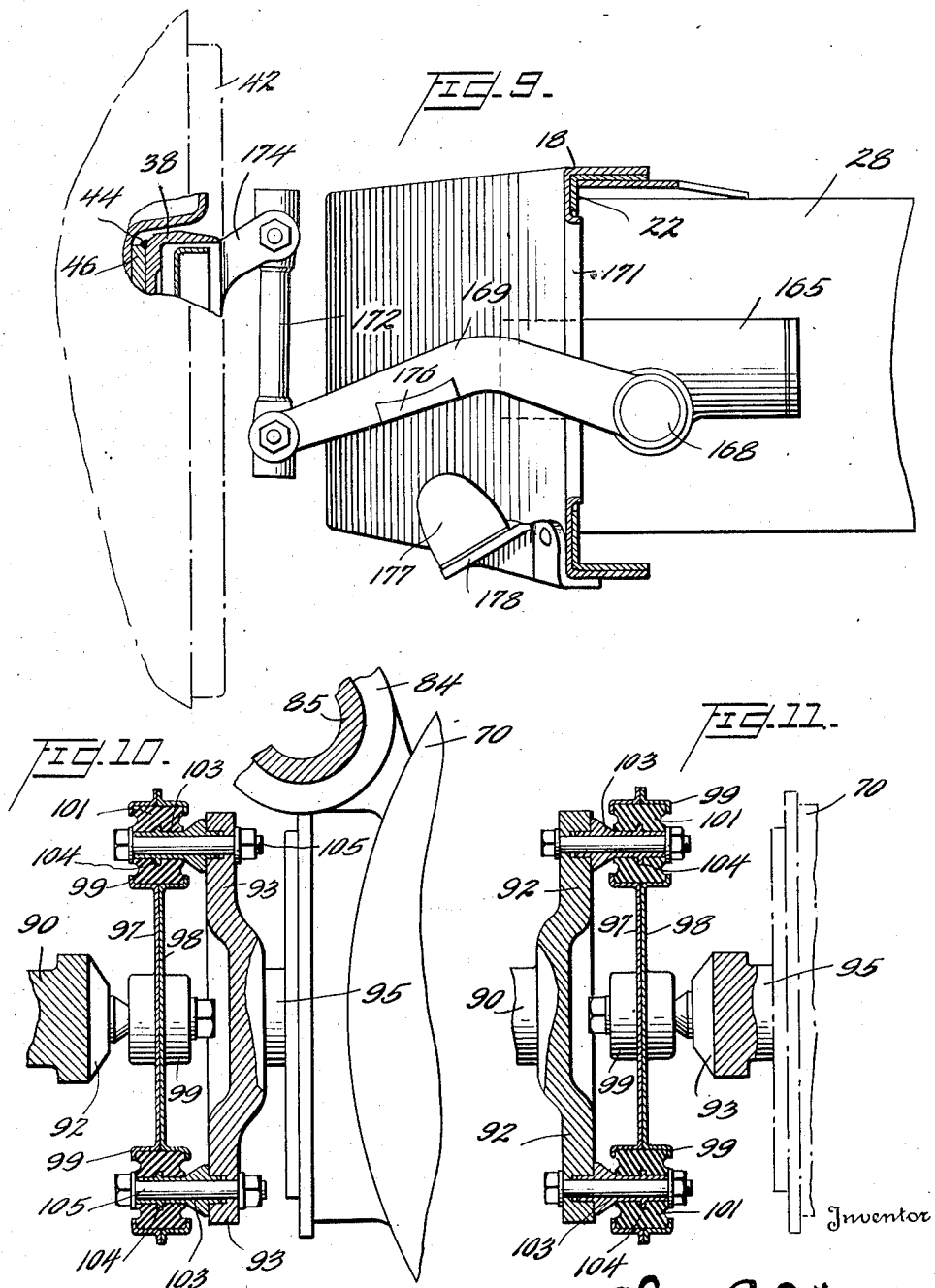

Patented Sept. 6, 1938

2,129,232

UNITED STATES PATENT OFFICE 2,129,232

MOTOR VEHICLE

Clyde R. Paton, Birmingham, Mich., assignor to Packard Motor Car Company, Detroit, Mich., a corporation of Michigan Application December 17, 1934, Serial No. 757,919

5 Claims. (Cl. 180—73)

This invention relates to motor vehicles and is more particularly concerned with wheel suspensions of the independent type and with driving mechanism for vehicle road wheels suitable for use with such wheel suspensions.

It is the principal object of the invention to provide a wheel suspension which is simple and inexpensive to construct and which will afford improved riding qualities and freedom from vibrational disturbances. The invention is particularly useful when applied to the suspension of the rear driving road wheels of the vehicle and is of such a nature as to counteract in large part the disagreeable effects produced on the sudden application of brakes to vehicles in which the front wheels are independently supported, especially where the front wheel suspension involves the employment of readily yielding means such as coil springs having little or no static friction. Thus in the preferred form of the present invention as applied to the suspension of the rear road wheels of the vehicle, wheel supporting arms pivotally connected to the frame on a common transverse axis disposed forwardly of the wheels are preferably employed, this arrangement tending to cause depression of the rear end of the vehicle frame when the brakes are applied. The pronounced tendency of a vehicle employing independent suspension at the forward end to dip on the application of brakes is thereby modified and the resultant effect is a slight and unobjectionable lowering of the whole frame when the vehicle is retarded or stopped, the usual disagreeable rocking of the frame about a transverse axis being avoided.

It is a more specific object of the invention to provide an independent wheel suspension for the rear driving road wheels in combination with driving mechanism for the wheels including differential gearing, the wheel supporting means and the differential gearing being supported on the vehicle frame through rubber for the purpose of cushioning road shock and damping vibrations. In the preferred form of the invention the wheel supporting means directly carries the wheel hub and the driving mechanism for the wheel is connected to the wheel through means disposed within the hub and affording relative lateral displacement between the driving mechanism and the wheel, to provide a compact and readily accessible structure.

Further objects and features of the invention will be apparent from the following description taken in connection with the accompanying drawings, in which Figure 1 is a plan view of a portion of a motor vehicle chassis illustrating the manner in which the present invention may be applied;

Figure 2 is an enlarged view, partly in section, of a portion of the structure shown in Figure 1;

Figure 3 is a sectional view taken substantially on the line 3—3 of Figure 1;

Figure 4 is a section on the line 4—4 of Figure 1;

Figure 5 is a section on the line 5—5 of Figure 1;

Figure 6 is a horizontal sectional view through the wheel hub and associated parts;

Figure 7 is a horizontal sectional view of a detail shown in Figure 1;

Figure 8 is a sectional view taken substantially on the line 8—8 of Figure 1;

Figure 9 is a sectional view taken substantially on the line 9—9 of Figure 1;

Figure 10 is a vertical sectional view through the universal joint on the longitudinally extending drive shaft shown in Figure 1; and Figure 11 is a horizontal sectional view through the universal joint shown in Figure 10.

Figure 1:
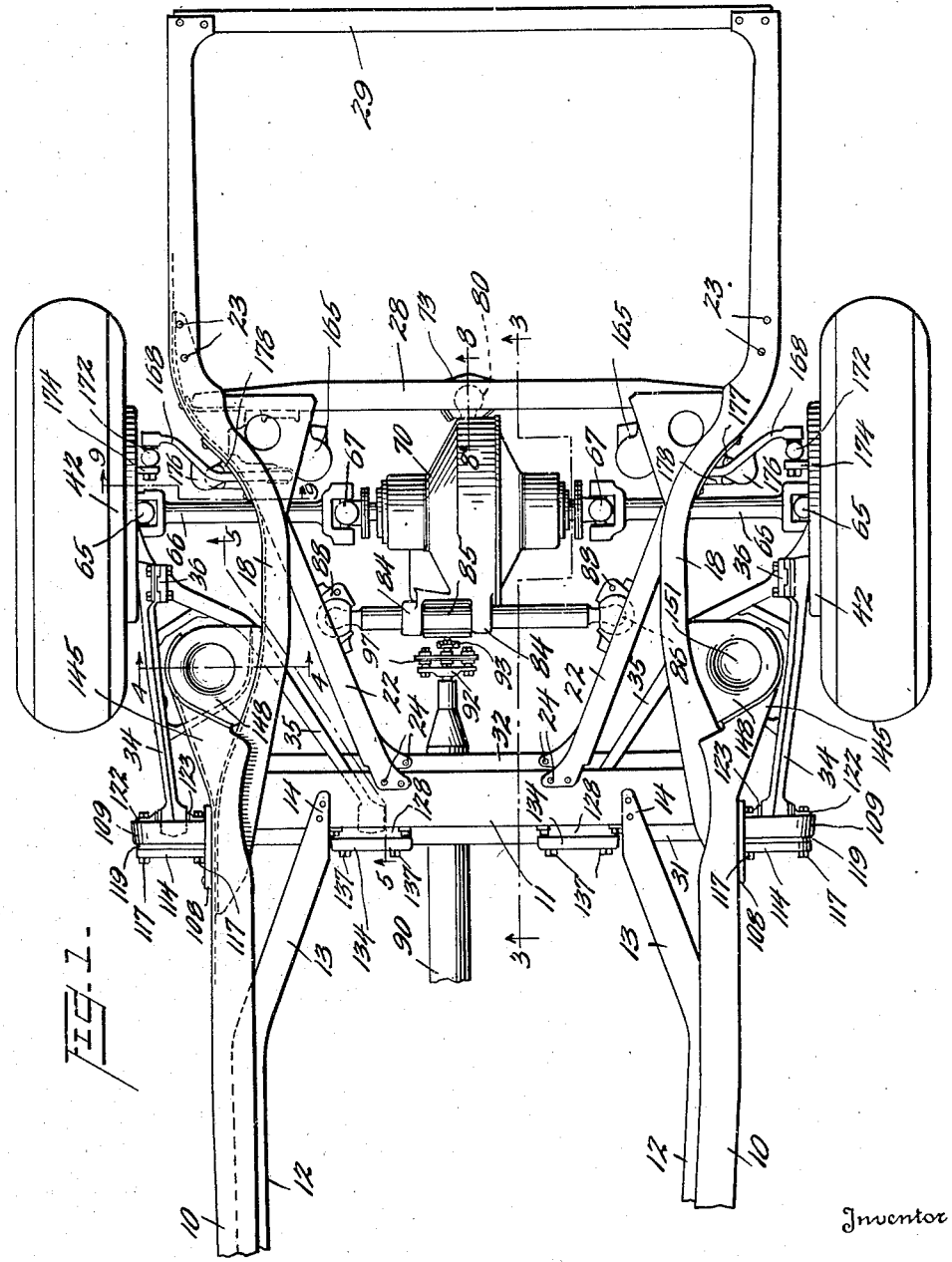

For convenience in illustrating the invention, the preferred form thereof is shown in the drawings as applied to the rear driving wheels of a vehicle, in connection with which the invention is particularly useful. It will nevertheless be understood that certain features of the invention are applicable to the front road wheels of a vehicle or to wheels which are not used for driving. It will also be appreciated that while specific language is used herein to facilitate a description of the embodiment of the invention shown in the drawings, no limitation of the scope of the invention is thereby intended, various alterations and modifications being contemplated such as would occur to one skilled in the art.

Referring first to Figure 1 of the drawings, it will be observed that the vehicle frame is illustrated as comprising the usual side sills 10, these side sills and the structural elements which form in effect continuations thereof to the extreme rear end of the vehicle being referred to for convenience hereinafter as side frame members. Thus each side sill 10 is preferably of channel section with the flanges thereof directed inwardly, the sills being reinforced in the mid portion of the frame by members 12, which are similarly of channel section and arranged with the flanges directed outwardly, the flanges of the sills 10 and members 12 being secured together to form a closed or box section. The rearward ends of the members 12 are deflected inwardly as indicated at 13 and are secured at 14 to a transverse member 11, the latter being in turn secured at its outer ends to the side sills 10 and to the rearward continuation thereof constituted by members 18. Fitting within and secured to the side sills 10 are the members 18 of channel section which are curved inwardly intermediate the ends thereof and which are preferably continued to form the extreme rear end of the frame. Structural members 22 of channel section preferably fit within and are secured to each member 18 as indicated at 23, extending forwardly therefrom and being secured as at 24 to the transverse member 11. A transverse member 28 of channel section is also arranged to extend between and be secured to the members 18 and the associated members 22. The extreme rear ends of the members 18 are preferably connected by a transverse member 29, it being observed that this portion of the frame need support only the usual gasoline tank, luggage carrier, or other accessories ordinarily provided at the rear of the vehicle.

The transverse frame member 11 may be formed to provide a main portion of generally channel section facing downwardly and having forwardly and rearwardly directed flanges 31 and 32, these flanges serving to substantially stiffen the member 11 and to facilitate the connection to the latter of the members 12, 22 as shown more particularly in Figure 2 of the drawings. The member 11 may be further strengthened by securing to the flanges 31 and 32 a plate 27, forming with the member 11 a completely closed section as shown in Figure 5.

A wheel supporting member carries each road wheel on the frame for rising and falling movement with respect thereto, this wheel supporting member preferably comprising arms 34 and 35 which merge adjacent the road wheel and which extend forwardly therefrom, being pivoted to the frame for swinging movement at laterally spaced points on a common axis in the manner hereinafter more particularly described. For instance the arms 34 and 35 may be either formed integrally or rigidly secured together as indicated at 36, the arm 34 being extended to provide a generally cup-shaped portion 38 to which may be secured by means of bolts 41 the conventional brake backing plate 42. Positioned intermediate the inner flange 43 of the brake backing plate 42 and the cup-shaped member 38, and preferably welded to the latter as indicated at 44, is the flange 46 formed on a wheel supporting sleeve 48, the latter constituting a carrier for the wheel bearings 49 on which the wheel hub 50 is directly journalled for rotation. Except as specifically mentioned herein, the wheel structure does not depart from conventional practice.

A driving spindle 52 extends within the wheel structure and is journalled as indicated at 53 in the sleeve 48. A member 54 is provided with a sleeve portion surrounding the spindle 52 and secured thereto, for instance by means of a bolt 56, cooperating key portions 57 or the like being provided to couple the member 54 and spindle 52 for rotation. The member 54 is also provided with a radial flange portion 58 having a toothed or splined periphery cooperating with a corresponding toothed or splined portion of the wheel hub 50 as indicated at 59, the construction being such as to permit relative lateral displacement of the member 54 and the hub 50 while ensuring rotative connection therebetween. A cap 61 is threaded on the end of the hub 50 so that the moving parts within the hub may be thoroughly lubricated, sealing means 63 and 64 acting between the sleeve 48 and the wheel hub 50 and spindle 52 respectively to prevent discharge of lubricant from the interior of the hub.

The spindle 52 is connected through a universal joint 65 to a laterally extending axle 66, and the latter is connected through a second universal joint 67 to gearing within a differential housing 70. The universal joints 65 and 67 may be of conventional construction and the details thereof form no part of the present invention.

The differential housing 70 is illustrated as supported at its rear end on the member 28, a brace member 71 preferably extending between the base of the member 28 and the lower flange thereof to reinforce the latter adjacent the point of support for the differential housing. The support may comprise a generally semispherical bracket 73 secured to the lower flange of the member 28 and a cooperating generally spherical cap portion 74 secured to the bracket 73, these two elements of the support affording an opening 75 in the forward side thereof through which may extend the rearwardly directed portion of a bracket 78. Bracket 78 may be bolted or otherwise secured to the differential housing as indicated at 79 and is provided with a generally spherical head portion 80 located within the support and surrounded by an element 82 of rubber or other deformable material, the element 82 being preferably vulcanized or otherwise surface bonded to the support and to the bracket 78. It will be observed that with this construction the differential housing is completely isolated from the frame at the point of rear support and is permitted slight rocking movement, such movement being accompanied by deformation of the element 82, whereby the transmission of shock is prevented and vibrational disturbances induced in the driving mechanism are damped.

At the forward side thereof the differential housing is provided with bosses 84 which are apertured to receive a transversely extending shaft 85, the bosses being preferably shrunk on the shaft to afford a tight fit therebetween. The outer ends of the shaft 85 are provided with generally spherical head portions 86 which are received in the complementary portions of a generally spherical socket 88, elements 89 of rubber or other deformable material being interposed between and preferably vulcanized or surface bonded to the sockets 88 and the head portions 86 of the shaft 85.

The drive system is preferably of the well-known Hotchkiss type in which the motor and the gearing within the differential housing are connected by a relatively long drive shaft 90 having universal joints at either end. For convenience, only the universal joint at the rear end and adjacent the differential housing is shown and this joint, while of conventional construction, is preferably so formed as to provide not only for the necessary angular movement between the drive shaft and the differential housing but to afford slight relative bodily displacement thereof in a generally longitudinal direction. Thus the joint may comprise outwardly directed arms 92 formed integrally with or secured to the drive shaft 90 and similar arms 93 secured to or formed integrally with a shaft 95, the latter extending into the differential housing 70 and being associated with the gearing therein to drive the latter in the conventional manner. Alternate arms 92 and 93 are preferably disposed at intervals of substantially 90°. A generally annular member comprising plates 97 and 98 secured in face to face contact is interposed between the arms 92 and the arms 93, the plates 97 and 98 being formed at intervals of 90° to provide generally cup-shaped portions 99 receiving therein blocks 101 of rubber or other deformable material of a similar nature. A bushing 103 extends through each of the rubber blocks and is preferably provided with a circumferential rib portion 104 lying within the blocks, the rubber blocks being vulcanized or otherwise surface bonded within the cup-shaped receptacles 99 and to the bushing 103. Each bushing 103 is in turn secured to one of the arms 92 or 93 by means of a bolt 105 passed through the bushing and the associated arm. By the employment of universal joints of this character, the necessary relative axial movement between the drive shaft and the differential housing is afforded, the rubber blocks being preferably of such size and of such a yielding nature that the use of a telescoping drive shaft is unnecessary. Furthermore, the rubber connection between the drive shaft and the driving and driven elements associated therewith absorbs and damps vibrational disturbances, being particularly useful in the elimination of noise, roughness of action, and the disagreeable action commonly referred to as clutch chatter.

Returning now to the arms 34 and 35 at each side of the vehicle, it will be observed that the arm 35 may extend through an opening 107 in the member 18, while the arm 34 preferably lies outside of the side frame member and is pivoted to the latter by means of a laterally extending bracket having a base portion 108 secured to the side sill 10. Formed integrally with the base portion 108 of the bracket is a generally cup-shaped structure 109 having apertures 110 therein through which bolts 111 may pass freely, the apertures 110 being of sufficient size to avoid direct contact of the bolts 111 and the cup-shaped structure 109. Each bolt 111 is provided with an enlarged portion 113 forming shoulders thereon, plates 114 and 115 being apertured to receive the bolts 111, nuts 117 serving to draw the plates into abutting relation with these shoulders.

Interposed between the cup-shaped structure 109 and the plates 114 and 115, are relatively thin sheets indicated at 119 and 120 respectively of rubber or similar deformable material which may be compressed slightly as the plates are secured in position on the bolts 111, the degree of compression being obviously limited by the length of the enlarged portions 113 of the bolts. The plate 115 is provided with a plurality of bosses 118 surrounding the bolts 111 and constituting abutments for laterally directed arms 122 formed on a member 123 constituting a pivot bearing for the arm 34, the arms 122 being apertured to receive the bolts.

It will be appreciated that with this construction the arm 34 is completely isolated from the vehicle frame, the sheets 119 and 120 of rubber serving not only to prevent the transmission of shock from the arms 34 to the frame, but acting to damp any vibrational disturbances.

The bracket which supports the forward end of the arm 35 is preferably constructed similarly to the supporting member for the arm 34, comprising a base portion 128 secured to the frame having a generally cup-shaped structure 129 formed integrally therewith provided with apertures 130 through which bolts 131 may pass freely. Each bolt 131 is provided with an enlarged portion 133 arranged for engagement by the plates 134 and 135 which are apertured to receive the bolts 131, nuts 137 serving to clamp the plates rigidly together in spaced relation to each other.

Interposed between the cup-shaped structure 129 and the plates 134 and 135 are relatively thin sheets of rubber or similar deformable material 139 and 140 which may be compressed slightly as the plates are secured in position by the bolts 131, the degree of compression being limited by the length of the enlarged portions 133 of the bolts. The plate 135 is provided with a plurality of bosses 138 surrounding the bolts 131 and constituting abutments for apertured arms 142 formed on a member 143, the latter affording a pivot bearing for the arm 35.

A spring abutment indicated generally at 144 is carried by each of the side frame members adjacent and above the arms 34 and 35. In the preferred form of the invention these abutments are carried directly by forwardly extending portions 145 of the side sills 10 and by the members 18 and are secured thereto by welding, riveting, or otherwise. As shown more particularly in Figure 4, the abutment may comprise a generally annular element 148 welded to the members 18 and 145, and a downwardly directed generally cup-shaped member 151 welded to the element 148. A coil spring 152 is interposed under compression between the frame supported abutment and an abutment indicated generally at 155 supported by and between the arms 34 and 35, the abutment 155 being generally similar in shape to the abutment 144 and comprising an annular element 156 which is preferably bolted as at 157 to the arms 34 and 35, a cup-shaped member 158 being welded or otherwise secured to the element 156. A member 160 of rubber or other deformable resilient material is secured to the member 158, for instance by vulcanization or surface bonding thereto, the construction being strengthened by the provision of an apertured element 161 embedded in the rubber and secured to the member 158 by welding. It will be observed that the member 160 is positioned for engagement with the member 151 in the event either of the arms 34 and 35 are swung upwardly to a sufficient extent, this construction thus limiting the upward displacement of the road wheels, either on failure of the coil springs 152 which constitute the principal or sole means for yieldingly resisting rising movement of the wheels, or when an extremely rough road bed is encountered such as would necessitate the reinforcement of the springs to prevent excessive relative displacement of the road wheels and the frame.

Shock absorbing means are preferably provided to resist sudden or rapid accelerative movement of the road wheels with respect to the frame. The shock absorbing means is preferably located as shown in Figures 1 and 2 near the rear of the vehicle and may comprise a shock absorbing unit 165 of conventional design secured to the transverse frame member 28, a generally cup-shaped reinforcing element 166 being secured to and within the frame member at this point. The mechanism within the shock absorbing unit 165 is actuated by a shaft 168 which is arranged to be rocked by means of a laterally extending arm 169 as the road wheel executes rising and falling movements, the arm 169 being secured to the shaft 168. The arm 169 extends through an opening 171 in the frame members 18 and 22 and is pivotally connected adjacent the outer end thereof with a link 172, the latter being in turn pivotally connected to an inwardly directed flange 174 which may be formed integrally with the cup-shaped portion 38 of the arm 34, or which may be rigid with any of the other non-rotating parts of the road wheel assembly.

Supplementing the action of the member 160 hereinbefore described an arrangement such as shown in Figure 9 may be employed to limit downward movement of the vehicle wheel with respect to the frame to an undesirable extent. This construction may comprise a member 176 formed integrally with or secured to the arm 169, this member being arranged for engagement with a block 177 of rubber or other deformable material secured to a bracket 178 which is in turn carried by the adjacent side frame member 18. The function of this arrangement is obvious from an inspection of Figure 9 of the drawings.

While the hereinbefore mode of operatively connecting the shock absorbing unit is preferred, it will be obvious to one skilled in the art that the unit may be located forwardly of the road wheel assembly and operatively connected to either of the arms 34 and 35 on the axis of pivotal connection of these arms to the frame; in other words, the operating shaft of the shock absorbing unit may serve as a fulcrum for either of the arms 34 and 35.

It will be observed that the frame construction is of unusual strength forwardly of the road wheels and is thus able to adequately resist the stresses applied thereto by the forwardly extending arms 34 and 35. Rearwardly of the road wheels the vehicle frame may be unusually light owing to the relatively small load which is applied thereto. The manner in which the individual road wheels are supported to also particularly effective since the load is distributed between two arms which are reinforced by the spring abutment 155, any lateral thrust applied to the road wheels being properly resisted by reason of the substantial spacing, as measured laterally of the frame, of the pivotal points of support for the arms 34 and 35.

Having thus described the invention, what is claimed as new and desired to be secured by Letters Patent is:

1. In a wheel suspension for motor vehicles, the combination with oppositely disposed road wheels, of a frame including side frame members, and means supporting each road wheel for independent rising and falling movement, said means comprising a wheel carrying member having divergent arms pivoted on said frame at spaced points on a common transverse axis, one of said arms extending through an opening in the adjacent side frame member.

2. In a wheel suspension for motor vehicles, the combination with oppositely disposed road wheels, of a frame including side frame members, means supporting each road wheel for independent rising and falling movement, said means comprising a wheel carrying member having divergent arms pivoted on said frame at spaced points on a common transverse axis, one of said arms extending through an opening in the adjacent side frame member, a transverse frame member extending between said side frame members, a support for said last named arm secured to said transverse frame member, and a support for the other of said arms extending outwardly of and secured to the adjacent side frame member.

3. In a wheel suspension for motor vehicles, the combination with oppositely disposed road wheels, of a frame including side frame members, means supporting each road wheel for independent rising and falling movement, said means comprising a wheel carrying member having divergent arms pivoted on said frame at spaced points on a common transverse axis, one of said arms extending through an opening in the adjacent side frame member, a transverse frame member extending between said side frame members, a support for said last named arm secured to said transverse frame member, and a support for the other of said arms extending outwardly of and secured to the adjacent side frame member, each of said supports including rubber interposed between and isolating said arms from said frame.

4. In a motor vehicle frame having side sills provided with portions affording abutments for rear wheel supporting coil springs and structural elements secured to said sills and forming extensions thereof rearwardly of said abutments, the combination with a transverse frame member secured to said sills, rear wheel supporting members pivoted to said transverse frame member, a differential housing having gearing therein operatively connected with said wheels, and means extending between said structural elements and said transverse frame member supporting said differential housing.

5. In a motor vehicle frame having side sills, portions affording frame carried abutments for rear wheel supporting coil springs, and structural elements secured to said sills and forming extensions thereof rearwardly of said abutments, the combination with a transverse frame member secured to said sills, of structural members extending between and secured to said structural elements and to said transverse frame member, a pair of rear wheel supporting members associated with each wheel and pivoted to said transverse frame member at spaced points, and a wheel carried spring abutment extending between each pair of wheel supporting members.

CLYDE R. PATON.